United States Patent [19]

Taniguchi et al.

[11] 4,425,403

[45] Jan. 10, 1984

[54] COATED PLASTIC ARTICLE

[75] Inventors: Takashi Taniguchi, Yasu; Jiro Mibae, Ohtsu, both of Japan

[73] Assignee: Toray Industries, Inc., Tokyo, Japan

[21] Appl. No.: 358,916

[22] Filed: Mar. 17, 1982

[30] Foreign Application Priority Data

Mar. 26, 1981 [JP] Japan .................................. 56-43197

[51] Int. Cl.³ .......................... B32B 5/16; B32B 27/36
[52] U.S. Cl. .................................. 428/331; 428/412; 428/413; 428/423.1; 428/447; 428/474.4; 428/500; 428/522; 428/524
[58] Field of Search ............ 428/412, 413, 331, 423.1, 428/447, 500, 474.4, 522, 524; 427/164, 54.1

[56] References Cited

U.S. PATENT DOCUMENTS

| | | | |
|---|---|---|---|
| 3,986,997 | 10/1976 | Clark | 428/412 X |
| 4,079,160 | 3/1978 | Philipson | 428/217 |
| 4,096,315 | 6/1978 | Kubacki | 427/164 X |
| 4,127,682 | 11/1978 | Laurin | 427/164 |
| 4,137,365 | 1/1979 | Wydeven et al. | 428/412 |
| 4,150,169 | 4/1979 | Bagley et al. | 427/54.1 |
| 4,211,823 | 7/1980 | Suzuki et al. | 428/412 |
| 4,225,631 | 9/1980 | Berger et al. | 427/54.1 |
| 4,329,378 | 5/1982 | Tarumi et al. | 427/164 X |

FOREIGN PATENT DOCUMENTS

| | | |
|---|---|---|
| 7524614 | 3/1977 | France . |
| WO80/01007 | 5/1980 | PCT Int'l Appl. . |
| 2053027 | 2/1981 | United Kingdom . |

*Primary Examiner*—Thomas J. Herbert, Jr.
*Attorney, Agent, or Firm*—Austin R. Miller

[57] ABSTRACT

A coated plastic article having a good appearance, uniform dyeing and excellent surface properties comprises a shaped plastic substrate and a coating, said shaped plastic substrate comprising a polymer of diethylene glycol bisallyl carbonate, said shaped plastic substrate having at least one unsmooth portion on the surface thereof, said shaped plastic substrate being treated with activated gas, ionized radiation and/or active ray, and said coating on at least one surface of the shaped plastic substrate being dyeable or having permeability to dyes.

12 Claims, 2 Drawing Figures

{ 4,425,403 }

COATED PLASTIC ARTICLE

BACKGROUND OF THE INVENTION

(1) Field of the Invention

This invention relates to a coated plastic article having a good appearance without lack of level-dyeing and excellent surface properties such as high-hardness and anti-fogging property.

(2) Description of the Prior Art

Polymers of diethylene glycol bisallyl carbonate are thermosetting plastics utilized in various fields.

Recently, these polymers have been popularly utilized for lenses, especially for sunglasses or ophthalmic lenses, since they are excellent in their optical quality, heat resistance, durability, chemical resistance, impact resistance, dyeability and the like.

These polymers are generally produced by cast-polymerizing a composition containing diethylene glycol bisallyl carbonate in the presence of a peroxide as the radical initiator, for example benzoyl peroxide or diisopropyl peroxydicarbonate.

Shaped articles comprising these polymers are, however, readily scratched during practical application thereof due to low surface hardness. Further, their surfaces easily wet with dew and become opaque under conditions of high temperature and high humidity due to an inferior anti-fogging property, although the polymers have the excellent properties mentioned above.

In order to remove these defects, various improvements have been proposed in which the surfaces of shaped articles of these polymers are coated with materials having a high hardness or good anti-fogging property. For example, a coating material having a high surface hardness is disclosed in U.S. Pat. No. 3,986,997, and an anti-fogging coating is disclosed in U.S. Pat. No. 4,127,682. The present inventors have also proposed, for example in U.S. Pat. No. 4,211,823, a dyeable coating for improving the surface hardness.

However, in the case where a shaped plastic article having an unsmooth portion on the surface thereof is subjected to dyeing, the unsmooth portion is dyed lightly or deeply and said portion is remarkably conspicuous. This defect in the quality of appearance reduced the commercial value of the article remarkably in some uses. Particularly, in articles strictly requiring good optical properties, for example plastic lenses for spectacles, this non-uniform-dyeing is fatal. A lens having two or more different foci, that is the so-called multifocal lens of spectacles for near and distance vision (refer to FIG. 1), and a lenticular lens for cataractous patients (refer to FIG. 2) are hardly used practically due to non-uniform-dyeing in the unsmooth portion (refer to FIGS. 1 and 2, denoted by C) when these lenses are tinted.

In the case of coating a plastic substrate with a certain material, it is known that the wettability and adhesion between the substrate and the coating material are improved by various kinds of surface treatment to the plastic substrate, for example chemical treatment such as alkali-treatment or oxidizing treatment, hot air treatment, flame cleaning, irradiation with ultraviolet or radiation, corona discharge, activation by cold plasma, and the like. These treatments are performed in order to provide the surface of the plastic substrate with polar groups to improve the wettability between the substrate and the coating material.

However, articles made of the polymer produced from diethylene glycol bisallyl carbonate have sufficient adhesion to the conventional coating material, and in usual cases it is not necessary to subject the articles made of the polymer to any of the above treatments. Further, a simple method such as alkali-treatment may be sufficient to improve the adhesion, if necessary.

Nevertheless, in the case where an article made of the polymer has an unsmooth portion on the surface thereof, a remarkably abnormal appearance results due to non-uniform dyeing of said portion when the article is tinted after being coated with a coating material.

U.S. Pat. No. 4,096,315 discloses a process for coating an optical plastic substrate by cold plasma polymerization. However, the substrate is different from diethylene glycol bisallyl carbonate polymer and furthermore the coated article is not dyeable. U.S. Pat. No. 4,137,365 discloses a treatment of a coated plastic substrate with oxygen plasma, and U.S. Pat. No. 4,225,631 discloses a treatment of a coated substrate with ultraviolet or radiation. These treatments, however, are exercised after applying a coating material to a plastic substrate and the non-uniformity of the dyeing is not improved at all. Further, U.S. Pat. No. 4,150,169 discloses a process comprising the steps of prewetting the valleys of an embossed thermoplastic substrate with a liquid of a low viscosity to remove the air bubbles and then coating the substrate with a coating material polymerizable to be a hard polymer by ultraviolet irradiation. Although the process has different objects and advantages from those of the present invention, and non-uniform dyeing is not decreased but instead is promoted by this process.

These disadvantages are overcome by the present invention.

When the polymer is treated with activated gas, ionized radiation and/or active ray according to the invention, the polymer surface, including any unsmooth portions coated with a dyeable coating, can be uniformly tinted.

SUMMARY OF THE INVENTION

It is an object of the invention to provide a coated plastic article having at least one unsmooth portion on the surface thereof and an excellent appearance without areas of non-uniform dyeing. The coated plastic article comprises a shaped plastic substrate and a coating, said shaped plastic substrate comprising a polymer of diethylene glycol bisallyl carbonate, said shaped plastic substrate having at least one unsmooth portion on at least a single surface thereof, said shaped plastic substrate being treated with activated gas, ionized radiation and/or active ray, and said coating on said surface of the shaped plastic substrate being dyeable or permeable to dyes.

The coated plastic article of the invention is produced by a process comprising the steps of forming a shaped plastic substrate having at least one unsmooth portion on the surface thereof by cast-polymerizing a composition consisting essentially of diethylene glycol bisallyl carbonate, treating the resulting shaped plastic substrate with activated gas, ionized radiation and/or active ray, applying a coating composition onto at least one surface having at least one unsmooth portion of the shaped plastic substrate and drying and/or curing the coating composition to obtain the coating.

Figure 1:
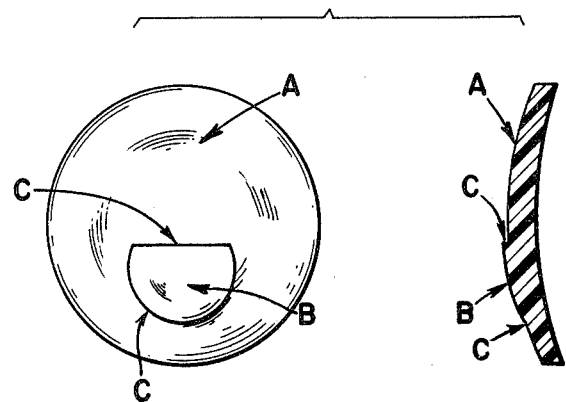
FIG. 1 shows a plane view and a cross sectional view of a bifocal lens which has a distant portion A and a reading portion B.
Figure 2:
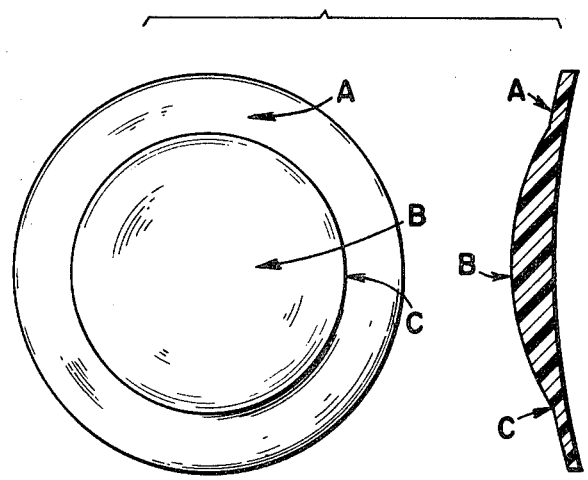
FIG. 2 shows a plane view and a cross sectional view of a lenticular lens for cataract patients, which has a margin A and an effective aperture B.

In the conventional lenses as shown in FIGS. 1 and 2, a portion C is not smooth and non-uniform dyeing occurs in portion C.

DETAILED DESCRIPTION OF THE PREFERRED EMBODIMENT

The monomer composition, consisting essentially of diethylene glycol bisallyl carbonate as a raw material of the shaped plastic substrate of the invention, comprises not less than 50% by mole, preferably not less than 80% by mole a monomer having the following chemical formula:

The composition may comprise less than 50% by mole, preferably less than 20% by mole of one or more monomers copolymerizable with diethylene glycol bisallyl carbonate. These copolymerizable monomers have at least one carbon-carbon double bond therein, for example monoester or polyester of acrylic acid or methacrylic acid with monofunctional or polyfunctional alcohol, styrene, diallyl phthalate, monoester or diester of maleic acid, furmaric acid or itaconic acid. Further, oligomers or polymers that are copolymerizable with diethylene glycol bisallyl carbonate and have two or more carbon-carbon double bonds may be also used. These monomers, oligomers and polymers may be used individually from one another or as a mixture thereof.

The shaped plastic substrate of the invention is made of thermosetting resin obtained by cast-polymerizing the composition described above. In addition, the shaped plastic substrate referred hereto includes a shaped article prepared by polishing the cast-polymerizate or a shaped article prepared by deforming the cast-polymerizate. The substrate may contain various additives for example an ultra violet absorber and/or an antioxidant.

"The unsmooth portion" according to the invention means a portion in which the curvature of the surface discontinuously changes. The substrate having at least one unsmooth portion on the surface thereof according to the invention is also a shaped article having so-called ledges or edges, for example a box-type article, an article having concave parts and convex parts for decoration or an embossed article. Especially certain spectacle lenses inevitably have unsmooth portions such as ledges. A multifocal lens such as a bifocal and a trifocal lens, a full-field lens and a lenticular lens for a cataract patient are examples of such lenses.

The activated gas for use in the treatments according to the invention includes ions, electrons or excited gas generated under a normal or a reduced pressure. The activated gas according to the invention may be generated by subjecting a gas, for example helium, air, nitrogen, argon or freon to a discharging, for example corona discharge or high-tension discharge with direct current, low frequency wave, high frequency wave or micro wave under a reduced pressure of the gas. The activated gas of the invention is preferably generated by subjecting one of said gases to high-tension discharge with direct current, low frequency wave, high frequency wave or micro wave under a pressure of $10^{-2}$ to 10 Torr of the gas due to the efficiency of treatment. The optimum condition for performing the treatment with the activated gas may be experimentally determined depending on the form and type of apparatus for treatment, the kind of gas used and the form and state of the surface of the article to be treated.

The ionized radiation for use in the invention may be gamma rays from cobalt-60, X-rays from an X-ray generator or neutron generated in a nuclear reactor, preferably an electron beam of accelerating energy of 0.3 to 3 MeV generated from an electron beam accelerator of, for example Van de Graaff type; Cockcroft type; Cockcroft-Walton type; insulated core transformer type; Dynamitron type; Resonant transformer type; or linear type accelerator. The exposure dose is suitably in the range of 0.1 to 10 Mrad.

The active ray of the invention may include infrared, visible or ultra violet rays, and particularly the active ray includes rays having a wave length of not more than 500 nm, more preferably ultra violet rays. Any source may be used in the invention to generate the active rays, although low pressure mercury lamp, high pressure mercury lamp, ultra-high pressure mercury lamp, xenon lamp or arc lamp may be preferably used in the invention due to the efficiency for treatment. An optimum exposing condition may be experimentally determined to achieve the object of the invention.

These treatments of the substrate may be performed simultaneously or step-wise. One surface or both surfaces of the shaped plastic substrate may be treated depending on the object of the invention. Among the above mentioned treatments, the treatment with the active ray may be more preferable. The treatment may be carried out at room temperature in the air, although the treatment of the invention is preferably performed in an atmosphere within which the partial pressure of oxygen is not higher than 10 Torr and at a temperature higher than the room temperature to rapidly obtain the advantages according to the invention.

The coating of the invention may be dyeable or permeable to dyes and may be a thermoplastic or a thermosetting polymer, for example polyurethane, melamine resin, organosilicon resin, polyvinylalcohol, acrylic resin, polyamide, epoxy resin or mixtures thereof. Preferably these polymers are at least partially cured. The coating is obtained from a coating composition set forth below.

The coating composition of the invention comprises at least one of the above-mentioned polymers and/or at least one precursor thereof. It is preferable to add fine particles of inorganic oxide, for example silica, titanium oxide, antimony oxide and/or aluminum oxide to the coating composition. Further, a catalyst or an additive may be added to the coating composition for improving the properties and the producibility thereof.

The preferable coating composition of the invention comprises a polyvinylalcohol and/or an organosilicon compound, particularly having epoxy groups. A more preferable coating composition comprises further fine silica particles of an average diameter of 5 to 200 nm to improve scratch resistance. The coating composition comprising an organosilicon compound, particularly having an epoxy group, fine silica particles having an average diameter of 5 to 200 nm and an aluminum chelate compound as a hardening catalyst is more preferable for improving the hardness of the surface. Among said coating compositions, a coating composition disclosed in U.S. Pat. No. 4,211,823 may be most preferable.

The coating composition may be applied to at least one portion of the shaped plastic substrate by a conventional coating method, for example brushing, dipping, spraying, flowing or spin coating. The coating of the invention may be obtained by drying and/or curing the coating composition applied to the surface of the shaped plastic substrate being treated with activated gas, ionized radiation and/or active ray, usually by heating with hot air or infrared lamp. A very important point of the invention is to apply the coating composition to the surface of the shaped plastic substrate after having been pretreated with activated gas, ionized radiation and/or active ray. If the treating with activated gas etc. is applied after the coating, the non-uniform dyeing is not improved at all.

The coated plastic article thus obtained by the invention may be tinted by a disperse dye or reactive disperse dye at a temperature higher than room temperature, preferably higher than 50° C., although the method and conditions for tinting may be experimentally determined depending on coating compositions.

Since the coated plastic article of the invention has improved abrasion resistance and/or anti-fogging property as well as the favorable properties of an diethylene glycol bisallyl carbonate polymer such as optical quality, impact resistance, chemical resistance and heat resistance, and may be dyeable without producing non-uniform dyeing, an article with a remarkably high commercial value may be obtained.

Further, prior to applying the coating composition thereto the shaped plastic substrate may be pretreated by, for example, chemical treatment with alkali or sanding for improving the adhesion or the like and the pretreatments may be performed before or after the treatments with activated gas, ionized radiation and/or active rays.

The invention will be further illustrated in more detail while referring to the following examples. It will be apparent to those skilled in the art that the invention is not limited to these examples and that variations may be made without departing from the spirit and the scope of the invention as defined in the claims which follow. In the Examples, "parts" and "percent" are by weight unless otherwise specified.

EXAMPLE 1

(A) Treatment of Shaped Plastic Substrate

A "CR-39 bifocal lens" (power of distance portion of 0.00 dioptre and add power of +3.00 dioptre) comprising a polymer of diethylene glycol bisallyl carbonate was placed into a Pyrex glass vessel and irradiated for two hours from the convex side under a vacuum (degree of vacuum; 0.5 Torr) with ultra violet rays generated from a ultra-high pressure mercury lamp (Type HB-500/B, Ushio Denki Co., Ltd. Japan) with a dose of 50 W/m$^2$.

(B) Preparation of Coating Composition

In a beaker, 128.7 parts of γ-glycidoxypropyl methyl diethoxy silane was placed and was hydrolyzed by adding, drop by drop, 18.7 parts of aqueous 0.05 N hydrochloric acid solution while maintaining the temperature of the reactant at 10° C. After the addition was over, 69.3 parts of γ-chloropropyl trimethoxy silane was added to the reaction mixture and then 18.9 parts of aqueous 0.01 N hydrochloric acid solution was added drop by drop while cooling and maintaining the temperature of the reactant at 10° C. to obtain a hydrolysate of silanes. After the addition was completed, 451.6 parts of silica sol dispersed in methanol (solid content of 30%), 34.4 parts of diethylene glycol dimethyl ether, 263.8 parts of methanol, 1.5 parts of a silicone type surfactant and 13.5 parts of aluminum acetylacetonate were added to the reactant and the whole reaction system was thoroughly mixed with stirring to obtain a coating composition.

(C) Preparation of Coated Lens

After dipping the lens treated in (A) above into an aqueous solution of sodium hydroxide and thoroughly washing it with water and drying, the lens was dipped into the coating composition obtained in (B) above with the pulling-up velocity of 10 cm/min to coat both the surfaces of the lens with the coating composition. The lens was dried at 90° C. for four hours to obtain a coated lens.

COMPARATIVE EXAMPLE 1

For comparison, a coated lens was prepared from a "CR-39 bifocal lens" in the same manner as in Example 1, however, without treating by ultra violet irradiation.

EXAMPLE 2

A "CR-39 full-field lens" (power of distance portion of −2.00 dioptre and add power of +3.00 dioptre) comprising the same diethylene glycol bisallyl carbonate polymer was treated in the same manner as Example 1 (A), and a coated lens was obtained in the same manner as Example 1 (B) and (C).

COMPARATIVE EXAMPLE 2

For comparison, a coated lens was prepared in the same manner as Example 2 using a "CR-39 full-field lens," however, without treating by ultra violet irradiation.

EXAMPLE 3

A coated lens was obtained in the same manner as in Example 1 except for using a coating composition prepared by adding to 142 parts of hydrolysate of silane as in Example 1 (B), 273 parts of silica sol dispersed in methanol (solid content of 30%), 73.5 parts of methanol, 3.1 parts of a silicone type surfactant and 8.2 parts of aluminum acetylacetonate and mixing the whole reaction system thoroughly while stirring, and using the pulling-up velocity of 2 cm/min.

COMPARATIVE EXAMPLE 3

For comparison, three coated lenses were prepared as follows. A coated lens (A) was prepared in the same manner as Example 3 except for the treatment with ultra violet rays; a coated lens (B) was prepared by applying the coating composition used in Example 3 to the lens of the same kind in Example 3, air-drying, treating with ultra violet rays in the same manner as Example 1 (A) and then heat-drying at 90° C. for four hours; and a coated lens (C) was prepared by applying the coating composition used in Example 3 to the lens of the same kind as in Example 3, drying at 90° C. for four hours and then treating with ultra violet rays in the same manner as in Example 1 (A).

EXAMPLE 4

A "CR-39 lenticular-type bifocal lens" (power of distance portion of +11.00 dioptre and add power of +2.00 dioptre) comprising the same diethylene glycol bisallyl carbonate polymer as in Example 1 was treated with ultra violet rays in the same manner as in Example 1, and a coated lens was prepared in the same manner as in Example 3.

COMPARATIVE EXAMPLE 4

For comparison, a coated lens was prepared in the same manner as in Example 4 by using a lens of the same kind as in Example 4 without treating with ultra violet irradiation.

EXAMPLE 5

The same lens used in Example 1 was treated for one hour with an activated gas generated from the plasma-generating apparatus (PR501A Yamato Kagaku Co., Ltd.) with a flow rate of nitrogen of 100 ml/min at 1 Torr and an output of 300 W, and a coated lens was prepared in the same manner as in Example 3.

EXAMPLE 6

The same lens as used in Example 1 was irradiated with an electron beam generated from a Van de Graaff-type electron beam accelerator with the flow of nitrogen and with a dose of 3 Mrad, and a coated lens was prepared in the same manner as in Example 3.

EXAMPLE 7

To 236 g of γ-glycidoxypropyl trimethoxy silane placed in a reactor with a rotor, 54 g of aqueous 0.01 N hydrochloric acid solution was added, drop by drop while maintaining the temperature at 10° C. and stirring with a magnetic stirrer. After the addition was completed, cooling was stopped and the hydrolysate of γ-glycidoxypropyl trimethoxy silane was obtained.

After introducing 500 g of an aqueous 15% solution of polyvinyl alcohol (average degree of polymerization of 600 and saponification value of 91% to 94% by mole) into a beaker, 53.3 g of water, 18.2 g of the hydrolysate of γ-glycidoxypropyl trimethoxy silane and 215 g of silica sol dispersed in methanol (solid content of 30%) were respectively added while stirring. To the mixture, 210 g of 1,4-dioxane, 0.5 g of a fluorocarbon-type surfactant and 3 g of aluminum acetylacetonate were added and the whole system was thoroughly mixed while stirring to obtain a coating composition.

The coating composition was applied in the same manner as in Example 3 to the lens treated in the same manner as in Example 1 (A) and dried at 130° C. for two hours. After drying, the lens was immersed in hot water of 90° C. for one hour, then washed with water and dried to obtain a coated lens.

EXAMPLE 8

The obtained coated lenses in Examples 1–7 and Comparative Examples 1–4 were evaluated as follows. The results are shown in Table 1.

(1) Abrasion Resistance

After rubbing the surface of the coated lens with steel wool #0000 under a load of 1.5 kg ten times repeatedly, flow-occurrences on the surface were observed and evaluated as follows.

A; almost no flaws were observed.
B; a small number of flaws were observed.
C; many flaws were observed on all over the surface.
Note: The lens comprising the polymer of diethylene glycol bisallyl carbonate was evaluated as C.

(2) Adhesion

The coating of the lens was cut along eleven parallel lines and other eleven parallel lines perpendicular thereto with a constant interval of 1 mm. An adhesive tape (registered trade name CELLOTAPE, Nichiban Co., Ltd. Japan) was stuck strongly on the cut surface of the lens and then peeled off suddenly to the vertical direction to observe exfoliation of the coating.

(3) Dyeability

The coated lens was dipped into a dyeing bath at 90° C. for ten minutes and was colored, the bath being prepared by dispersing and dissolving disperse dyes into water. The uniformity of dyeing was observed by naked eye.

(4) Anti-fogging Property

After allowing the coated lens to stand in a room at 23° C. and 50% RH for one day, the lens was exposed to an atmosphere at 30° C. and 100% RH, and the time for being clouded was measured.

Note: The untreated CR-39 lens was wholly clouded as soon as it was placed in the atmosphere above.

TABLE 1

| Example | Abrasion resistance | Adhesion | Dyeability | Anti-fogging property |
|---|---|---|---|---|
| Example 1 | A | Good | Good | — |
| Comparative Example 1 | A | Good | non-uniform* dyeing on the discontinuous part | — |
| Example 2 | A | Good | Good | — |
| Comparative Example 2 | A | Good | non-uniform* dyeing on the ledges | — |
| Example 3 | A | Good | Good | — |
| Comparative Example 3(A) | B | Good | non-uniform* dyeing on the discontinuous part | — |
| Comparative Example 3(B) | C | Good | non-uniform* dyeing on the discontinuous part | — |
| Comparative Example 3(C) | C | Good | non-uniform* dyeing on the discontinuous part | — |
| Example 4 | B | Good | Good | — |
| Comparative Example 4 | B | Good | non-uniform* dyeing around the added part | — |
| Example 5 | B | Good | Good | — |
| Example 6 | B | Good | Good | — |
| Example 7 | — | Good | Good | 81.4 sec |

Note:
*light and shade,
**light.

EXAMPLE 9

Both surfaces of an L-shaped article comprising a polymer of diethylene glycol bisallyl carbonate of 2 mm in thickness, and 50 mm in length and 30 mm in width were treated in the same manner as in Example 1 (A) for two hours.

The thus treated L-shaped article was coated with the coating composition of Example 1 in the same manner as in Example 1 so that the inner and outer surface of the article were vertical to the surface of the liquid coating composition, and the article was cured by heating.

The thus coated L-shaped article was examined in the same manner as in Example 8. Abrasion resistance and adhesion were good, and non-uniform dyeing was not produced.

In comparison, the coated article obtained by coating the untreated L-shaped article showed non-uniform dyeing at the inner edge thereof.

What is claimed is:

1. A coated plastic article comprising a shaped plastic substrate having a coating, said shaped plastic substrate comprising a polymer of diethylene glycol bisallyl carbonate, said shaped plastic substrate having at least one unsmooth portion on at least a single surface thereof, said shaped plastic substrate having been treated with activated gas, ionized radiation and/or active ray previously to a coating process, said coating being dyeable or permeable to dyes, and said coating comprising at least one polymer selected from the group consisting of polyurethane, melamine resin, organosilicon resin, polyvinyl alcohol, acrylic resin, polyamide and epoxy resin.

2. The coated plastic article of claim 1, which is a multifocal lens.

3. The coated plastic article of claim 1, which is a lenticular lens.

4. The coated plastic article of claim 1, wherein the shaped plastic substrate comprises a polymer of not less than 50% by mole of diethylene glycol bisallyl carbonate.

5. The coated plastic article of claim 1, wherein the shaped plastic substrate comprises a polymer of not less than 80% by mole of diethylene glycol bisallyl carbonate.

6. The coated plastic article of claim 1, wherein the coating comprises at least one polymer selected from the group consisting of organosilicon resin, polyvinyl alcohol and epoxy resin, said polymer being at least partially cured.

7. The coated plastic article of claim 1, wherein the coating further contains fine silica particles with an average diameter in the range of 5 to 200 nm.

8. The coated plastic article of claim 1, wherein the activated gas is generated from high-tension discharge with direct current, low frequency wave, high frequency wave or micro wave under a pressure of $10^{-2}$ to 10 Torr.

9. The coated plastic article of claim 1, wherein the ionized radiation is an electron beam with an accelerating energy in the range of 0.3 to 3 MeV.

10. The coated plastic article of claim 1, wherein the treatment of the shaped plastic substrate with activated gas, ionized radiation and/or active ray is performed under an atmosphere of which the partial pressure of oxygen is not more than 10 Torr.

11. The coated plastic article of claim 1, wherein the active ray includes rays with a wave length of not more than 500 nm.

12. The coated plastic article of claim 11, wherein the rays with a wave length of not more than 500 nm are ultra violet rays.

* * * * *